Patented Dec. 14, 1948

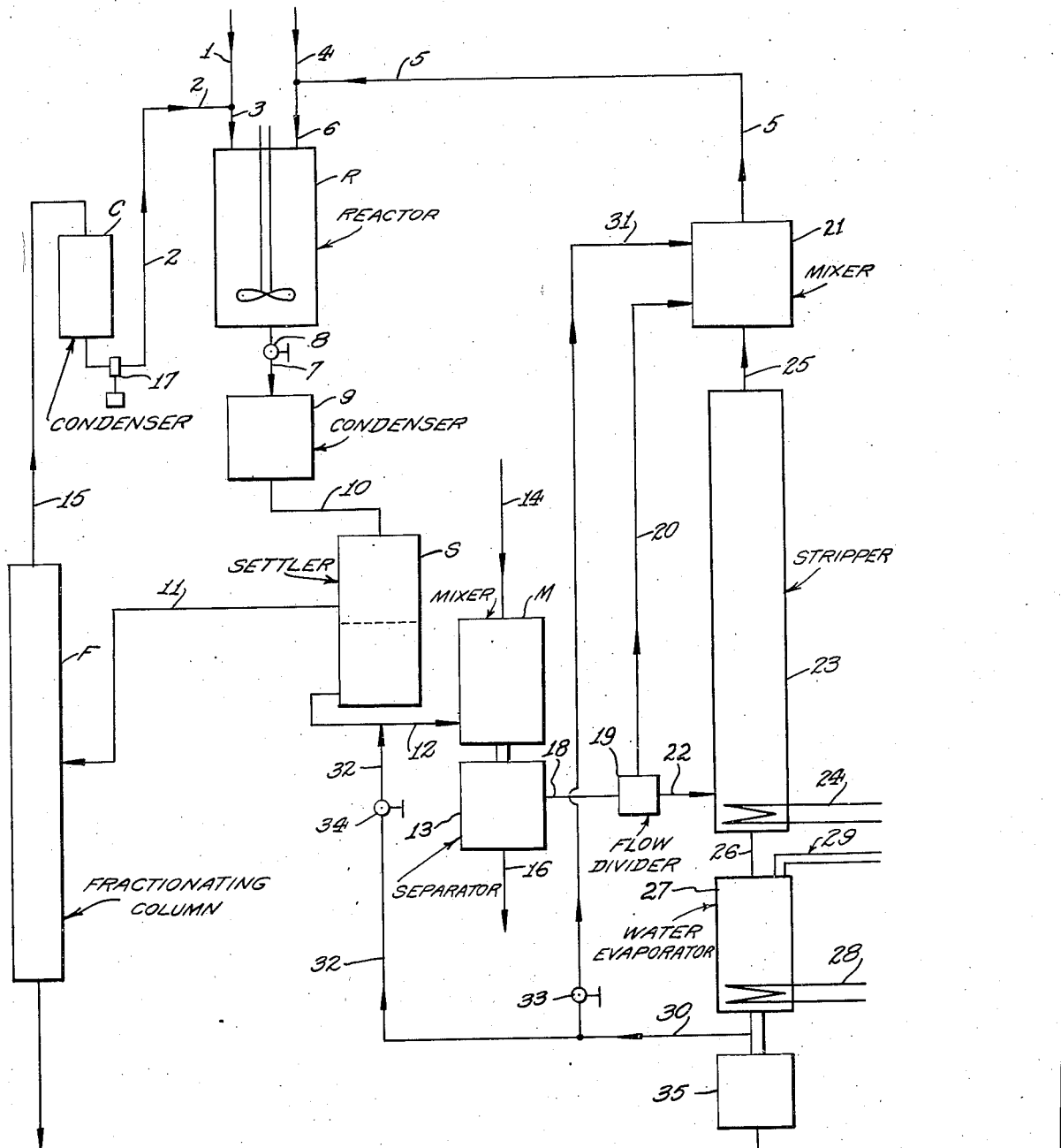

2,455,932

UNITED STATES PATENT OFFICE 2,455,932

PROCESS OF MAKING ARYL AMINES

Everett C. Hughes, Cleveland Heights, Ohio, assignor to The Standard Oil Company, Cleveland, Ohio, a corporation of Ohio Application November 25, 1944, Serial No. 565,151

4 Claims. (Cl. 260—577)

This invention relates to a process for making amino substituted aromatic compounds.

It has been proposed heretofore to make aniline by reacting ammonia with chlorobenzene in the presence of a catalyst such as copper chloride. An excess of ammonia is generally employed, and the hydrogen chloride by-product reacts with a part of the excess ammonia to form ammonium chloride. In order to recover the ammonia from the ammonium chloride for reuse, it is common to add a base stronger than ammonia, which releases the ammonia and forms the corresponding chloride salt. At the same time the copper chloride is precipitated by the base as the hydroxide or oxide. The precipitate can be separated from the solution of the chloride salt and reused. This process has the disadvantage that the copper oxides are difficult to separate and filter, and the further disadvantage of requiring the resolution of the separated copper compound.

It is an object of the process of the invention to provide a process of forming amino substituted aromatics in which the catalyst is retained in solution, and may be reused in solution form in a continuous process.

A further object of the invention is to provide a process in which the halogen released from the aromatic compound is precipitated as a halide salt without the precipitation of the catalyst.

An additional object of the invention is the provision of a process in which water is evaporated equivalent to that formed by the neutralization to yield the halide salt or otherwise introduced into the system.

An additional object of the invention is to provide a process in which only the halogenated aromatic, ammonia or amine, and a neutralizing base are utilized in chemically equivalent amounts and in which the amino substituted aromatic, the halide salt, and water are the only products formed and separated from the reaction so that all other unreacted materials and the catalyst can be continuously recycled.

The invention is applicable to the production of a wide variety of amino-substituted aromatics, such as aniline from a mono-halogenated benzene and ammonia, or an N-alkyl aniline from a halogenated benzene and an alkylamine.

For illustrative purposes only, the invention will be described as applied to the reaction of monochlorobenzene with mono-methylamine in the presence of a copper chloride as a catalyst to form N-methyl aniline as the wanted product and with the use of caustic soda as the neutralizing base to form sodium chloride and water as the by-products.

The process is preferably carried out as a continuous operation, since it is in such a process that the recovery and reuse of the catalyst and unreacted ingredients is possible on a highly economic scale.

In carrying out the illustrative process the chlorobenzene is placed in a reactor together with an aqueous phase containing methylamine and copper chloride in a substantially saturated aqueous solution of sodium chloride. The chlorobenzene is relatively insoluble in the aqueous solution and tends to exist as a distinct phase. However, the two phases can be intimately admixed by any appropriate agitating means. The reaction is continued under temperature and pressure conditions, as indicated hereinafter, and is permitted to proceed for the desired length of time to obtain a good yield. The initial chemical reaction may be viewed substantially as follows:

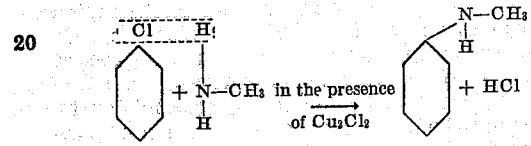

However, inasmuch as an excess of the methylamine preferably is employed, the hydrochloric acid produced will react with such an excess in accordance with the following reaction to form the amine hydrochloride:

At the conclusion of the reaction, the agitation may be discontinued and the reaction mixture will separate in two phases. Inasmuch as the reaction is generally carried out at an elevated temperature and pressure, in order that it may proceed to a good yield in a reasonable time, it is convenient to cool the mixture before the separation is accomplished.

One layer comprises the N-methyl aniline and any small amount of unreacted chlorobenzene. This layer may be withdrawn and subjected to fractional distillation. Any unreacted chlorobenzene can be separated readily from the N-methyl aniline because of their wide difference in boiling point. The recovered chlorobenzen can be recycled to the reaction zone.

The other layer comprises an aqueous phase containing the unreacted excess of methylamine, the methylamine hydrochloride, and the copper chloride catalyst in the saturated solution of sodium chloride.

In general, the lower layer is the aqueous phase, but it is possible for the lower layer to be the non-aqueous phase in the case of low catalyst concentration and low conversion.

The aqueous phase containing the methylamine, methylamine hydrochloride and copper chloride is then mixed with caustic soda in the exact amount to release substantially all of the methylamine from the hydrochloride and this reaction will be as follows:

$$CH_3NH_3Cl + NaOH \rightarrow CH_3NH_2 + NaCl + H_2O$$

If the amount of the caustic is not in excess of that required to complete the above reaction, the copper chloride will remain in the solution. The sodium chloride precipitates from a saturated solution thereof and can be separated. The water formed by the neutralization is evaporated and the methylamine and the copper chloride in solution may be recycled with the saturated sodium chloride solution.

Reference may be had to the drawing as illustrative of a process that embodies the invention, and the following description taken in connection with the drawing, is a specific example included merely for illustrative purposes:

A supply of mono-chlorobenzene is fed through the conduit 1 and mixed with any unreacted chlorobenzene which has been recovered and returned through the conduit 2. This is charged to the reactor R through the conduit 3. The amount of fresh chlorobenzene fed in the conduit 1 is equivalent to that converted to N-methyl aniline in a single pass in the continuous process.

A fresh supply of methylamine is fed through the conduit 4 and mixed with the return mixture comprising methylamine and copper chloride in a substantially saturated solution of sodium chloride which is returned through conduit 5. The mixture is discharged through the conduit 6 into the reactor R. The amount of fresh methylamine fed through the conduit 4 is equivalent to that reacted in a single pass in a continuous process.

The reactor R may be constructed so as to operate either continuously or intermittently. Thus it may be a batch reactor or it may be constructed so that the ingredients pass continuously through it at such a rate of flow as to remain in the reactor for a desired length of time. The reactor may comprise a plurality of separate mixers, through which the reaction mixture flows sequentially, and these may be maintained at different pressures or temperatures, if desired.

The conditions in the reactor R are selected to produce an optimum yield per pass. The reactor may be heated by any suitable means.

The temperature selected for the reaction preferably should be such that the reaction proceeds at a rate so that good yields may be obtained in a reasonable time. In general, the temperature should be about 100 to 300° C.; the preferred range being about 170 to 240° C. and within this range a temperature of 210° to 225° C. seems to be optimum when the other variables are optimum. Too high temperatures are to be avoided as they tend to introduce side reactions.

The pressure employed is sufficient to keep the material in the liquid phase at this temperature. Higher pressures may be used but with no material advantage. This suggests the desirability of not employing any higher pressure than is necessary to maintain a liquid phase operation. Pressures within the range of 200 to 1500 pounds per square inch have been observed.

The proportion of the various ingredients for optimum yields may vary considerably. The amount of the catalyst may be expressed conveniently in relation to the methylamine since these are both contained in the same aqueous phase. The ratio of the copper chloride catalyst to the methylamine may be from 0.01 to 1.0, expressed as copper (atomic)/methylamine (mol). With larger amounts of catalyst it is possible to utilize somewhat lower temperatures and shorter reaction times and this suggests the use of a large amount. Generally, a ratio of 0.1 to not over 0.4 is desirable. There is some evidence that the conversion of chlorobenzene per pass falls off somewhat if the amount of the catalyst is too large. The amount to be selected in a commercial embodiment will be within the above ranges and will be related largely to the other variables of the process.

The ratio of the methylamine to the chlorobenzene is such as to have a substantial excess of the methylamine, since this removes the hydrochloric acid by-product, the accumulation of which otherwise would slow the reaction. Stoichiometric considerations indicate that at least 2 mols of methylamine should be used for each mol of chlorobenzene. There is probably no upper limit except the objection to recycling the excess. An upper limit of 10 mols is reasonable in a commercial operation. In a continuous process there is no particular objection to having the large excess, since this can be recycled and does not involve any economic loss.

The reaction time should be adjusted with reference to the other variables and should be such as to obtain as high a yield as possible. Under the optimum conditions of the other variable good yields can be obtained in a reaction time as small as 10 minutes, but preferably the reaction time is from one-half to one hour. With increased amounts of catalyst, optimum proportions and at the higher temperatures, the reaction time can be made very short.

The concentration of the methylamine in the aqueous phase is more or less critical and has an important effect upon the yield of the N-methyl aniline, especially when the minimum reaction time is used as it would be in a continuous commerical operation. The preferred concentration is 40 to 75% methylamine based on the total aqueous phase. The optimum concentration appears to be about 60%, and the conversion per pass falls off on either side of this figure unless much longer reaction times are used. It is very desirable to obtain optimum conversion per pass in a minimum time as this increases the net amount of the N-methyl aniline that can be made with equipment of a given capacity. This effect of the concentration of methylamine is quite unexpected since the literature states that the concentration of ammonia in the amination of chlorobenzene has no effect on the rate of the reaction when ammonia is employed.

As indicative of the yields that may be obtained in relation to a specific example, 500 parts by weight of a 60% aqueous solution of methylamine and 240 parts by weight of cuprous chloride in a solution saturated with sodium chloride at room temperature is fed through the conduit 6, and 220 parts by weight of chlorobenzene is fed through conduit 3. The reaction is continued at a temperature of 215° C. for 30 minutes under the pressure generated at this temperature to maintain all of the ingredients in the liquid phase.

The reaction mixture is then discharged through the conduit 7 by means of the reducing valve 8 into a condenser 9 where it may be cooled, for example, to a temperature of 20 to 100° C. at a pressure to maintain the ingredients in the liquid phase.

The cooled mixture is then discharged through the conduit 10 to a settler S. The upper or organic layer is essentially a mixture of N-methyl aniline and any unreacted chlorobenzene. This is fed through the conduit 11 to the fractionating column F. The N-methyl aniline, since it has the higher boiling point, is separated at the bottom of the column and discharged. The unreacted chlorobenzene is sent through the conduit 15, liquefied in a condenser C, from which it may be returned by the pump 17, through the conduit 2, and reused in the next pass of ingredients.

Operating under these conditions, the organic layer separated in the conduit 11 comprises 90% of N-methyl aniline and 10% of unreacted chlorobenzene.

The aqueous layer from the settler S contains the excess of methylamine, methylamine hydrochloride, and copper chloride in a saturated solution of sodium chloride. The system outside the reactor will generally be at about room temperature. The aqueous layer is discharged through the conduit 12 to a mixer M into which a concentrated caustic soda solution or anhydrous caustic soda is introduced through the line 14. The amount of the caustic soda introduced is not in excess of that required to liberate the amine from the methylamine hydrochloride formed in the reaction. Sodium chloride will be formed in an amount chemically equivalent to the caustic added. Inasmuch as the aqueous phase being introduced through the conduit 12 is a saturated solution of sodium chloride, the formation of additional sodium chloride will result in a supersaturated solution, especially after the addition of the concentrated solution through the conduit 32, as described later. It is important not to add an excess of caustic at this stage, since it is desired to retain all of the copper chloride in solution. If anything, slightly less than the stoichiometric amount should be used since any amide hydrochloride not decomposed would simply be recycled through the process. It is desirable, however, to liberate as much of the methylamine from the hydrochloride as can be accomplished in a commercial operation without precipitating the copper. Under carefully controlled conditions, substantially all of the amine can be liberated.

The mixture is transferred to a salt separator 13, which may be in the form of a continuous pressure filter or a centrifuge, in which sodium chloride is removed and discarded at 16.

It is indeed surprising that a salt as soluble as sodium chloride can be precipitated in this way without precipitating any copper, and that the presence of the saturated solution of sodium chloride in the feed in the conduit 6 does not interfere with the reaction of the amine and the chlorobenzene.

The aqueous amine filtrate containing the methylamine and copper chloride in an aqueous solution of sodium chloride is then passed through the conduit 18 to a flow divider 19 which comprises control valves with appropriate meters and controls. A portion of this flow passes through the conduit 20 to the mixer 21 to be described later. The remaining portion of the flow passes through the line 22 to a stripping column 23 containing a heater or reboiling coil 24. In this stripper, methylamine is distilled out and sent through the conduit 25 to the mixer 21. The remainder of the solution containing sodium chloride and the copper chloride catalyst is withdrawn from the stripping column through the conduit 26 and sent to an evaporator 27 provided with a heater 28. In this evaporator sufficient water is removed through the conduit 29 to be equivalent to that formed by the reaction of the caustic with the amine hydrochloride and any introduced with the caustic solution, if the caustic is added through the line 14 in the form of an aqueous solution.

The concentrated solution leaves the evaporator through the line 30 when it is sent to the mixers M or 21 by means of lines 31 and 32 and the valves 33 and 34. All of this material in the conduit 18 could be sent to the stripper 23, but it is more economical to divide the flow and treat only a part in the stripper 23 and the water evaporator 27, since the treatment of only a part of the mixture reduces the amount of the methylamine that must be volatilized and condensed. The relative amounts of the materials which the flow divider sends through lines 20 and 22 is governed by a number of factors including the concentration of the amine in the aqueous layer, the extent of the conversion per pass in the reactor R, the amount of water in the caustic added to the mixer M, the efficiency of the stripper 23 and other factors. The flow divider is so regulated that upon admixture of the materials in the mixer 21, the resultant material returning through the conduit 5 remains at a fixed uniform concentration. The flow divider can be readily set, depending upon the conditions under which the stripper 23 and water evaporator 27 are operated, to give the desired constituents in the mixture returning through the conduit 5.

It may be desirable to operate the process so that the solution in the line 5 is slightly less than saturated with sodium chloride so as to avoid precipitating salt in the condenser 9 after the amine hydrochloride is formed, since the presence of the latter may affect solubility conditions.

The illustrative embodiment described in connection with the drawing is intended only as a flow sheet and not as a description of the relative size, location and description of the various pieces of apparatus to be used. Those skilled in the art will be able to select the latter in view of the method explained herein.

It will also be obvious that many modifications may be made in the process other than the specific flow sheet indicated. For instance the removal of water in the evaporator 27 may result in the precipitation of salt which may be separated in a salt separator 35 or the apparatus may be so arranged that salt which is precipitated in any part of the apparatus may move by gravity to a single pressure filter press or centrifuge for removing the salt. If desired a portion of the solution may be refrigerated to precipitate additional salt.

In another variation, the mixture in the conduit 12 may be sent directly to the flow divider 19 and the portion divided through the conduit 21 may be concentrated and salt removed before the neutralization with the caustic. This method would be particularly desirable if the amount of water added with the caustic is so large as to prevent precipitation of salt in the separator 13. By returning all of the concentrate from the evaporator through the conduit 32 it is easier to precipitate the salt in the separator 13.

It may also be desirable to introduce the fresh methylamine into the line 12 instead of through the conduit 4 so that the solution can be adjusted in the evaporator and the salt precipitator in the presence of all of the methylamine and so that there is no danger of precipitation upon admission of the fresh methylamine supply.

The fundamental thing involved in the invention is the separation of the salt formed by neutralization and also the water formed or added. This can be accomplished in any number of different ways as will be apparent to those skilled in the art.

I have described the process as applied to the production of N-methyl aniline from chlorobenzene and methylamine. The process can be applied to the production of aniline, toluidines, xylidines, cumidines, etc., by the reaction of the appropriate halogenated aromatic with ammonia, or other N-alkyl anilines, toluidines, xylidines, cumidines, etc., by reaction with other amines, such as ethylamine, di-methylamine, and other lower alkyl amines of different varying degrees of substitution. By lower amines is meant alkyl radicals as 5 carbon atoms or less. The exact conditions to be selected can be determined by those skilled in the art.

The process that has been described is one in which the halogen is chlorine. Since the chlorinated aromatics are cheaper, they would invariably be used on a commercial scale. However, any other aromatic halides could be used similarly. Polyhalogenated aryl compounds may be used to form similar polyamines.

The neutralizing base has been disclosed as caustic soda but it may be any base stronger than ammonia or the amine being used, such as caustic potash or lime. In general bases of alkali and alkaline earth metals are preferred.

In the above description a preference for copper chloride as the catalyst has been indicated. This may be either $Cu_2Cl_2$ or $CuCl_2$ which are about of equal effectiveness as starting materials. The copper chloride may shift from the cuprous to the cupric state and vice versa depending on the conditions of the reaction.

It is obvious that my invention may be practiced by variations in the conditions and other factors indicated heretofore and I intend all of the same to be included within the invention as filed within the scope of the following claims.

I claim:

1. A process of making arylamines, which comprises mixing a non-aqueous phase comprising chlorobenzene with an excess of an ammoniacal compound selected from the group consisting of ammonia and lower alkyl amines and a copper chloride catalyst in an aqueous phase substantially saturated with an alkali metal chloride at a temperature and for a time to obtain the aryl amine corresponding to said ammoniacal compound as the wanted reaction product and the corresponding ammoniacal hydrochloride as a by-product, separating the aqueous and non-aqueous phases from the reaction, separating the aryl amine from any unreacted chlorobenzene and recycling the latter, liberating at least a part of said amine from said hydrochloride by adding to the aqueous phase alkali metal caustic in an amount not in excess of one mol per mol of said hydrochloride, separating at least a part of the alkali metal chloride and of any water formed by the addition of said caustic and recycling the alkylamine and the copper chloride in solution with the alkali metal chloride.

2. The process of making aniline, which comprises mixing a non-aqueous phase comprising chlorobenzene with an excess of ammonia and a copper chloride catalyst in an aqueous phase substantially saturated with sodium chloride at a temperature and for a time to obtain aniline as the wanted reaction product and ammonium chloride as a by-product, separating the aqueous and organic phases from the reaction, separating the aniline produced from any unreacted chlorobenzene and recycling the latter, liberating substantially all the ammonia from the ammonium chloride by adding caustic soda to the aqueous phase in an amount not in excess of one mol per mol of the said chloride, separating at least part of the sodium chloride and the water formed upon said neutralization, and recycling the ammonia and the copper chloride in solution.

3. The process of making N-alkyl aniline, which comprises mixing a non-aqueous phase comprising chlorobenzene with an excess of a lower alkyl amine and a copper chloride catalyst in an aqueous phase substantially saturated with an alkali metal chloride at a temperature and for a time to obtain a lower N-alkyl aniline as the wanted reaction product and an amine hydrochloride as a by-product, separating the aqueous and non-aqueous phases from the reaction, separating the N-alkyl aniline from any unreacted chlorobenzene and recycling the latter, liberating at least a part of said amine from said hydrochloride by adding to the aqueous phase alkali metal caustic in an amount not in excess of one mol per mol of said hydrochloride, separating at least part of the alkali metal chloride and the water formed by the addition of said caustic, and recycling the alkylamine and the copper chloride in solution with the alkali metal chloride.

4. The process of making N-methyl aniline which comprises mixing a non-aqueous phase comprising chlorobenzene with an aqueous phase comprising a substantially saturated solution of sodium chloride, 40 to 75% methylamine and a copper chloride catalyst, at a temperature in the range of 170° to 240° C. and for a reaction time in the range of one-half to one hour, the relative proportions of said two phases being such as to provide at least 2 mols of the methylamine for each mol of the chlorobenzene; separating the aqueous and non-aqueous phases after the reaction has proceeded to form N-methyl aniline as the wanted product and methylamine hydrochloride as the by-product, separating the N-methyl aniline from any unreacted chlorobenzene and recycling the latter, liberating at least a part of the methylamine from the methylamine hydrochloride by adding to the separated aqueous phase caustic soda in an amount not in excess of one mol per mol of said methylamine hydrochloride, separating at least a part of the sodium chloride and the water formed by the addition of the caustic soda, and recycling the methylamine and copper chloride in solution with sodium chloride.

EVERETT C. HUGHES.

REFERENCES CITED

The following references are of record in the file of this patent:

UNITED STATES PATENTS

| Number | Name | Date |
|---|---|---|
| 1,726,170 | Britton | Aug. 27, 1929 |
| 1,726,171 | Williams | Aug. 27, 1929 |
| 1,726,172 | Williams | Aug. 27, 1929 |
| 1,935,515 | Mills | Nov. 14, 1933 |
| 2,028,065 | Hale | Jan. 14, 1936 |

OTHER REFERENCES

Chem. Abstracts, vol. 31 (1937), p. 1776.

Certificate of Correction

Patent No. 2,455,932.

December 14, 1948.

EVERETT C. HUGHES

It is hereby certified that errors appear in the printed specification of the above numbered patent requiring correction as follows:

Column 4, line 31, for the word "variable" read *variables*; column 5, line 41, for "amide" read *amine*;

and that the said Letters Patent should be read with these corrections therein that the same may conform to the record of the case in the Patent Office.

Signed and sealed this 3rd day of May, A. D. 1949.

[SEAL]

THOMAS F. MURPHY,
*Assistant Commissioner of Patents.*